(12) United States Patent
Ishizu et al.

(10) Patent No.: US 9,544,781 B2
(45) Date of Patent: Jan. 10, 2017

(54) COMMUNICATION MANAGEMENT DEVICE AND COMMUNICATION MANAGEMENT METHOD

(71) Applicant: NATIONAL INSTITUTE OF INFORMATION AND COMMUNICATIONS TECHNOLOGY, Koganei-shi, Tokyo (JP)

(72) Inventors: Kentaro Ishizu, Koganei (JP); Hiroshi Harada, Koganei (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 214 days.

(21) Appl. No.: 14/412,413

(22) PCT Filed: Nov. 28, 2012

(86) PCT No.: PCT/JP2012/007628
§ 371 (c)(1),
(2) Date: Dec. 31, 2014

(87) PCT Pub. No.: WO2014/006664
PCT Pub. Date: Jan. 9, 2014

(65) Prior Publication Data
US 2015/0230097 A1    Aug. 13, 2015

(30) Foreign Application Priority Data

Jul. 5, 2012    (JP) .................................. 2012-151651

(51) Int. Cl.
*H04W 16/14*    (2009.01)
*H04W 40/12*    (2009.01)
(Continued)

(52) U.S. Cl.
CPC ............. *H04W 16/14* (2013.01); *H04W 40/12* (2013.01); *H04W 72/0453* (2013.01); *H04W 76/023* (2013.01); *H04W 84/18* (2013.01)

(58) Field of Classification Search
CPC ............. H04W 16/14; H04W 72/0453; H04W 76/023; H04W 40/12; H04W 84/18
See application file for complete search history.

(56) References Cited

U.S. PATENT DOCUMENTS

2011/0310816 A1*  12/2011  Kim ..................... H04W 72/042
                                                    370/329
2013/0090071 A1*   4/2013  Abraham .............. H04W 16/14
                                                     455/73
(Continued)

FOREIGN PATENT DOCUMENTS

| EP | 2592857 A1 | 5/2013 |
| JP | 2012034326 A | 2/2012 |
| WO | 2012005093 A1 | 1/2012 |

OTHER PUBLICATIONS

Federal Communications Commission, Unlicensed Operation in the TV Broadcast Bands, Second Memorandum Opinion and Order, FCC, 10-17-4, Sep. 23, 2010.
(Continued)

*Primary Examiner* — Marcos Torres
(74) *Attorney, Agent, or Firm* — Holtz, Holtz & Volek PC (57) ABSTRACT

Provided is a management device maintaining communication qualities while accommodating a changeable communication environment. Based on correspondence between each geographical position of plural managed devices and available frequencies thereat, pair available frequencies available in common by arbitrary two managed devices are specified for each pair, and notified to the arbitrary two devices. From managed devices, acquiring pair communication qualities obtained when the pair available frequencies is used, defined is a best pair available frequency capable of obtaining a best pair communication quality. Specifying all of candidate paths connecting the each pair, relaying other managed devices, calculated are, based on the best pair communication quality, path communication qualities in the candidate paths connecting the each pair using the best pair (Continued)

available frequency. Selecting for the each pair a use path having a best quality in the path communication qualities, communication between the each pair is performed by using the use path.

6 Claims, 6 Drawing Sheets

(51) Int. Cl.
    *H04W 76/02*     (2009.01)
    *H04W 72/04*     (2009.01)
    *H04W 84/18*     (2009.01)

(56) References Cited

U.S. PATENT DOCUMENTS

2013/0100893 A1    4/2013    Sawai
2014/0086194 A1*  3/2014    Sugahara .............. H04W 28/16
                                                   370/329

OTHER PUBLICATIONS

IEEE802.11af Task Group, http://mentor.ieee.org/802.11/.
IEEE802.19.1 Task Group, http://mentor.ieee.org/802.802.19/documents.
IETF RFC 3626, Optimized Link State Routing Protocol (OLSR).
International Search Report (ISR) dated Feb. 19, 2013 issued in International Application No. PCT/JP2012/007628.
Kentaro Ishizu et al., "Wireless Network System for TV White Space with Coordination of Database", IEICE Technical Report, May 17, 2012, vol. 112, No. 55, pp. 23-30, ISSN 0913-5685.
Ofcom, Digital Dividend: Cognitive Access, Consultation on License Exempting Cognitive Devices using Interleaved Spectrum, Jul. 2009.
International Preliminary Report on Patentability (IPRP) including Written Opinion dated Jan. 15, 2015, issued in parent International Application No. PCT/JP2012/007628.

* cited by examiner

FIG. 1

——— LINK THAT CAN BE ESTABLISHED

| MANAGED DEVICE | AVAILABLE (EFFECTIVE) FREQUENCY |
|---|---|
| A | a (A PLURALITY OF FREQUENCIES SOMETIMES EXIST) |
| B | b (SAME AS ABOVE) |
| C | c (SAME AS ABOVE) |
| D | d (SAME AS ABOVE) |

FIG. 4

| LINK PAIR | PAIR AVAILABLE FREQUENCY |
|---|---|
| A-B | $(a \cap b)_1, (a \cap b)_2, ..., (a \cap b)_{nAB}$ |
| A-C | $(a \cap c)_1, (a \cap c)_2, ..., (a \cap c)_{nAC}$ |
| A-D | $(a \cap d)_1, (a \cap d)_2, ..., (a \cap d)_{nAD}$ |
| B-C | $(b \cap c)_1, (b \cap c)_2, ..., (b \cap c)_{nBC}$ |
| B-D | $(b \cap d)_1, (b \cap d)_2, ..., (b \cap d)_{nBD}$ |
| C-D | $(c \cap d)_1, (c \cap d)_2, ..., (c \cap d)_{nCD}$ |

$(_nC_2$ PAIRS)

6 PAIRS AT n = 4

10 PAIRS AT n = 5

15 PAIRS AT n = 6

FIG. 5

| LINK PAIR | PAIR AVAILABLE FREQUENCY | PAIR COMMUNICATION QUALITY |
|---|---|---|
| A-B | $(a \cap b)_1, (a \cap b)_2, ..., (a \cap b)_{nAB}$ | $Q_{AB1}, Q_{AB2}, ..., Q_{ABnAB}$ |
| A-C | $(a \cap c)_1, (a \cap c)_2, ..., (a \cap c)_{nAC}$ | $Q_{AC1}, Q_{AC2}, ..., Q_{ACnAC}$ |
| A-D | $(a \cap d)_1, (a \cap d)_2, ..., (a \cap d)_{nAD}$ | $Q_{AD1}, Q_{AD2}, ..., Q_{ADnAD}$ |
| B-C | $(b \cap c)_1, (b \cap c)_2, ..., (b \cap c)_{nBC}$ | $Q_{BC1}, Q_{BC2}, ..., Q_{BCnBC}$ |
| B-D | $(b \cap d)_1, (b \cap d)_2, ..., (b \cap d)_{nBD}$ | $Q_{BD1}, Q_{BD2}, ..., Q_{BDnBD}$ |
| C-D | $(c \cap d)_1, (c \cap d)_2, ..., (c \cap d)_{nCD}$ | $Q_{CD1}, Q_{CD2}, ..., Q_{CDnCD}$ |

FIG. 6

| LINK PAIR | BEST PAIR AVAILABLE FREQUENCY | BEST PAIR COMMUNICATION QUALITY |
|---|---|---|
| A-B | (a∩b) * | $Q_{AB*}$ |
| A-C | (a∩c) * | $Q_{AC*}$ |
| A-D | (a∩d) * | $Q_{AD*}$ |
| B-C | (b∩c) * | $Q_{BC*}$ |
| B-D | (b∩d) * | $Q_{BD*}$ |
| C-D | (c∩d) * | $Q_{CD*}$ |

FIG. 7

| COMBINATION PAIR | CANDIDATE PATH (BOLD OBLIQUE TYPE: SELECTED PATH [= USE PATH]) |
|---|---|
| A-B | *A-B*, A-C-B, A-D-B, A-C-D-B, A-D-C-B |
| A-C | A-C, *A-B-C*, A-D-C, A-B-D-C, A-D-B-C |
| A-D | A-D, *A-B-D*, A-C-D, A-B-C-D, A-C-B-D |
| B-C | *B-C*, B-A-C, B-D-C, B-A-D-C, B-D-A-C |
| B-D | *B-D*, B-A-D, B-C-D, B-A-C-D, B-C-A-D |
| C-D | *C-D*, C-A-D, C-B-D, C-A-B-D, C-B-A-D |
| ($_nC_2$ PAIRS) | ($_{i=0}\sum^{n-2}{}_{(n-2)}C_i \cdot i!$ PATHS EACH) |
| 6 PAIRS AT n = 4 | 5 PATHS AT n = 4 EACH |
| 10 PAIRS AT n = 5 | 16 PATHS AT n = 5 EACH |
| 15 PAIRS AT n = 6 | 65 PATHS AT n = 6 EACH |

———— ESTABLISHED LINK
- - - - - - UNESTABLISHED LINK

FIG. 8

| COMBINATION PAIR | CANDIDATE PATH (BOLD OBLIQUE TYPE: FOLLOWING SELECTED PATH [= FOLLOWING USE PATH]) |
|---|---|
| A-B | *A-B*, A-C-B, A-D-B, A-C-D-B, A-D-C-B |
| A-C | A-C, *A-B-C*, A-D-C, A-B-D-C, A-D-B-C |
| A-D | *A-D*, A-B-D, A-C-D, A-B-C-D, A-C-B-D |
| B-C | *B-C*, B-A-C, B-D-C, B-A-D-C, B-D-A-C |
| B-D | B-D, *B-A-D*, B-C-D, B-A-C-D, B-C-A-D |
| C-D | C-D, C-A-D, C-B-D, C-A-B-D, *C-B-A-D* |

——— ESTABLISHED LINK
- - - - - - UNESTABLISHED LINK

COMMUNICATION MANAGEMENT DEVICE AND COMMUNICATION MANAGEMENT METHOD

TECHNICAL FIELD

The present invention relates to a communication management device provided for the purpose of managing communication devices to operate under a television white space (TVWS) environment and a communication management method thereof, and particularly relates to a communication management device and a communication management method suitable for the case where a parallel network structure (a mesh network) can be formed by a plurality of communication devices being managed devices making a group.

BACKGROUND ART

Standards of wireless communication to use the same frequency band as that of a television broadcast being a licensed business and to be capable of being operated with no such a license, have been investigated. In these standards, a television broadcaster is regarded as a primary user, and only when a licensed frequency band of the primary user is not used, a secondary user is allowed to operate wireless communication in the frequency band (the licensed frequency band that is not used=white space).

In order to confirm that no TV signals exist, a communication device being the secondary user used under such an environment inquires of a dedicated database about TV channels, for example. That is, current position information of the communication device is transmitted to the database, and a list of frequencies available (effective) at the position is obtained from the database. Then, a frequency to be used is selected from the frequencies of the list and as the secondary user, wireless communication is operated.

On the other hand, as one embodiment of the secondary user, there is conceived an embodiment in which a plurality of communication devices are connected to one another in a manner to form a mesh, and even when only one of the communication devices has a function to communicate with the Internet and the like, all the communication devices can be connected to the Internet and the like through a meshed network. Further, as long as the plurality of communication devices form a mesh as above, when these communication devices perform communication with one another, the communication is completed in the network (the mesh network), so that it is efficient.

With regard to the secondary users that can form a mesh network, management for maintaining the mesh network is required, and further, communication is performed by using the white space, so that management for the communication is also required. Particularly, it is conceived that well maintaining communication qualities while accommodating a change in momentarily changeable communication environment is important for the secondary users capable of forming a mesh network in the white space.

PRIOR ART DOCUMENT

Non-Patent Document

Non-Patent Document 1: IEEE802.11af Task Group, http://mentor.ieee.org/802.11/
Non-Patent Document 2: IEEE802.19.1 Task Group, http://mentor.ieee.org/802.802.19/documents
Non-Patent Document 3: Federal Communications Commission, Unlicensed Operation in the TV Broadcast Bands, Second Memorandum Opinion and Order, FCC, 10-17-4, Sep. 23, 2010.
Non-Patent Document 4: Ofcom, Digital Dividend: Cognitive Access, Consultation on License Exempting Cognitive Devices using Interleaved Spectrum, July 2009.
Non-Patent Document 5: IETF RFC 3626, Optimized Link State Routing Protocol (OLSR)

SUMMARY OF THE INVENTION

Problems to be Solved by the Invention

The present invention has an object to provide a communication management device provided for the purpose of managing communication devices to operate under a television white space (TVWS) environment and a communication management method thereof, the communication management device and the communication management method thereof being applied to a parallel network structure (a mesh network) formed by a plurality of managed devices making a group and being capable of well maintaining communication qualities while accommodating a momentarily changeable communication environment.

Means of Solving the Problems

In order to solve the above-described problems, a communication management device being one embodiment of the present invention includes: a storing unit configured to store and retain a corresponding list, the list making each geographical position of a plurality of managed devices to be managed correspond to available frequencies indicating frequencies available at the each geographical position; a first specifying unit configured to specify, for each combination pair being arbitrary two managed devices out of the plurality of managed devices, frequencies available in common by the arbitrary two managed devices as pair available frequencies based on the corresponding list; a notifying unit configured to notify the pair available frequencies to each of the arbitrary two managed devices related to the pair available frequencies; an acquiring unit configured to acquire each of pair communication qualities being a quality of communication in the each combination pair obtained when each of the pair available frequencies specified for the each combination pair is used from each of the plurality of managed devices; a defining unit configured to define, for the each combination pair, a best pair available frequency out of the pair available frequencies, being capable of obtaining a best of the pair communication qualities and to define a best pair communication quality out of the pair communication qualities, corresponding to the best pair available frequency; a second specifying unit configured to specify, for the each combination pair, all of paths connecting one and another of the each combination pair, each of the paths being capable of relaying other managed devices out of the plurality of managed devices as candidate paths of the each combination pair; a calculating unit configured to calculate, for the each combination pair, based on information of the best pair communication quality, each of path communication qualities being a quality of communication in each of the candidate paths connecting one or more communications in the each combination pair using the best pair available frequency; a selecting unit configured to select, for the each combination pair, a path out of the candidate paths, the path having a best quality in the path communication qualities as a use path for the each combination pair; and a directing unit configured to direct each of the plurality of managed devices to perform communication between one and another of the each combination pair by using the use path connecting one or more communications in the each combination pair using the best pair available frequency.

This communication management device stores and retains a corresponding list where each geographical position of a plurality of managed devices to be managed and available frequencies indicating frequencies available at the each geographical position are made to correspond. Then, it specifies, for each of all the combination pairs of two managed devices of the plurality of managed devices, frequencies available in common by the two managed devices as pair available frequencies based on the above-described corresponding list. Further, it notifies the pair available frequencies to each of the two managed devices related to the pair available frequencies.

Next, it acquires pair communication qualities being qualities of communication in the combination pair obtained when the pair available frequencies specified for the combination pair are used from each of the plurality of managed devices. Then, it defines, for each of the combination pairs, the pair available frequency at which the best pair communication quality is obtained as the best pair available frequency and defines the pair communication quality corresponding to the best pair available frequency as the best pair communication quality.

Next, it specifies, for each of the combination pairs, all the paths including paths where communication is relayed by another managed device as candidate paths corresponding to each of the combination pairs. Then, it calculates, based on information of the best pair communication quality, path communication qualities as communication quality of each of the candidate paths where one or more communications of the combination pair using the best pair available frequency are made for each of the combination pairs. Further, it selects the candidate path where the best path communication quality is obtained from the candidate paths as a use path for each of the combination pairs.

Finally, it directs each of the plurality of managed devices to perform communication between one and another of the combination pair by using the use path where one or more communications connecting the combination pair using the best pair available frequency is made. According to the communication through such a use path, it is possible to well maintain the communication qualities while accommodating a momentarily changeable communication environment. This is because originally, each of the pair communication qualities being quality of communication between the combination pair obtained when the pair available frequencies are used is acquired from each of the plurality of managed devices, and based on it, the communication between one and another of the combination pair by using the use path connecting one or more communications using the best pair available frequency is performed.

Further, a communication management method being another embodiment of the present invention includes: storing and retaining a corresponding list, the list making each geographical position of a plurality of managed devices to be managed correspond to available frequencies indicating frequencies available at the each geographical position; specifying, for each combination pair being arbitrary two managed devices out of the plurality of managed devices, frequencies available in common by the arbitrary two managed devices as pair available frequencies based on the corresponding list; notifying the pair available frequencies to each of the arbitrary two managed devices related to the pair available frequencies; acquiring each of pair communication qualities being a quality of communication in the each combination pair obtained when each of the pair available frequencies specified for the each combination pair is used from each of the plurality of managed devices; defining, for the each combination pair, a best pair available frequency out of the pair available frequencies, being capable of obtaining a best of the pair communication qualities and defining a best pair communication quality out of the pair communication qualities, corresponding to the best pair available frequency; specifying, for the each combination pair, all of paths connecting one and another of the each combination pair, each of the paths being capable of relaying other managed devices out of the plurality of managed devices as candidate paths of the each combination pair; calculating, for the each combination pair, based on information of the best pair communication quality, each of path communication qualities being a quality of communication in each of the candidate paths connecting one or more communications in the each combination pair using the best pair available frequency; selecting, for the each combination pair, a path out of the candidate paths, the path having a best quality in the path communication qualities as a use path for the each combination pair; and directing each of the plurality of managed devices to perform communication between one and another of the each combination pair by using the use path connecting one or more communications in the each combination pair using the best pair available frequency.

This communication management method is a management method conforming to the above-described communication management device.

Effect of the Invention

According to the present invention, it is possible to provide a communication management device provided for the purpose of managing communication devices to operate under a television white space (TVWS) environment and a communication management method thereof, the communication management device and the communication management method thereof being applied to a mesh network and being capable of well maintaining communication qualities while accommodating a momentarily changeable communication environment.

MODE FOR CARRYING OUT THE INVENTION

As a mode of the present invention, it further includes: a second acquiring unit configured to acquire the geographical position from each of the plurality of managed devices; a transmitting unit configured to transmit each of the geographical positions to a database; and a receiving unit configured to receive the corresponding list transmitted from the database as information corresponding to the each geographical position for the purpose of storing and retaining the corresponding list.

In this mode, the communication management device acquires information of the geographical position from each of the managed devices and transmits each of the geographical positions to the database, to then make inquiry. That is, this mode is a mode in which the communication management device can make inquiries to the database even in the case when each of the managed devices does not have a connection to the database. Conversely, in the case when each of the managed devices has a connection to the database, it is also possible that they inquire of the database about the available frequency in the managed device and the communication management device acquires information of the available frequencies being the information corresponding to each geographical position from the managed devices to collect the information of the available frequencies as the above-described corresponding list.

Further, as a mode, it is possible to design that it further includes a functioning unit configured to function as one of the plurality of managed devices. That is, in this mode, one of the managed devices is provided with the configuration as the communication management device, in other words, it is a configuration in which one of communication devices positioned in parallel that are capable of forming a mesh is also the communication management device. As above, it is possible to make an independent device take on the function as the communication management device, and it is also possible to make one of communication devices positioned in parallel that are capable of forming a mesh take on the function as the communication management device.

Further, as a mode, it is possible to design that it further includes a second directing unit configured to direct each of the plurality of managed devices to measure each of the pair communication qualities. That is, this is a mode in which when a change in communication environment is detected on the communication management device side, for example, in order to update a mesh structure (link states), a direction to start an operation of the update is given temporarily. In addition to the case of giving a direction described above, it is also possible to design that, for example, the measurement of the pair communication quality is performed periodically in the plurality of managed devices, results of the measurements are reported to the communication management device each time, and the results are accumulated in the communication management device.

Further, as a mode, it is possible to design that the pair communication qualities are qualities based on one or more pieces of information out of, mutual electric field intensity between one and another of the each combination pair that are capable of using the pair available frequencies and are related to the pair communication qualities, maximum communication speed, delay, jitter, a packet loss rate, and a bit error rate between the one and the other of the each combination pair that are obtained when the pair available frequencies are used. These are concrete examples of the pair communication qualities. The plurality of pair communication qualities can also be used. Incidentally, when path communication quality is calculated by using the pair communication quality, a certain evaluation function can be used depending on the nature of the used pair communication quality.

Figure 1:
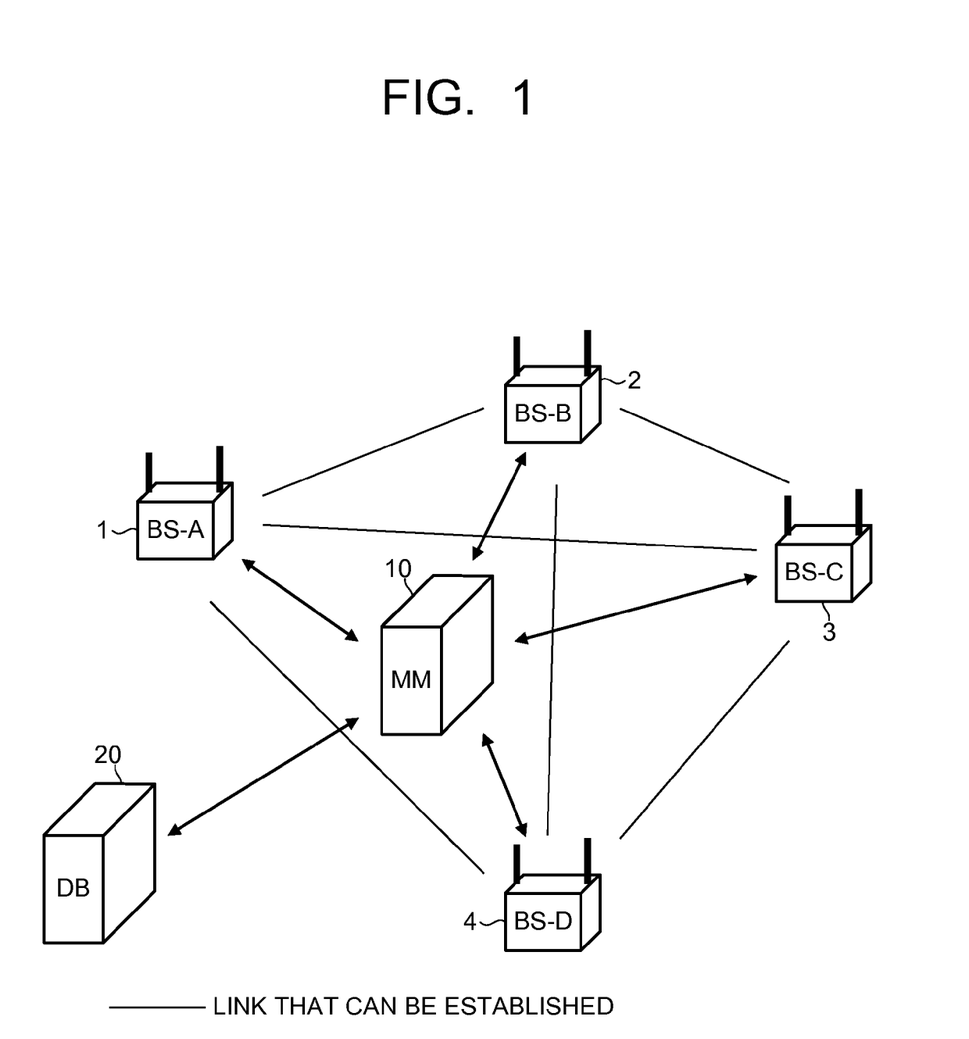
FIG. 1 is a system configuration diagram used for explaining a mesh network under a white space where a communication management device (MM) being one embodiment of the present invention can be provided.

Based on the above description, there will be explained an embodiment of the present invention below with reference to the drawings. First, with reference to FIG. 1, there will be explained a mesh network under a white space where a communication management device in an embodiment can be provided. FIG. 1 is a system configuration diagram to explain a mesh network under a white space where a communication management device being one embodiment of the present invention can be provided.

As illustrated in the same drawing, this system includes: managed devices 1, 2, 3, and 4 (as an example, four devices are applied, but the number of devices are not limited); a communication management device (a mesh manager: MM) 10; and a database 20. The managed devices 1 to 4 are wireless communication devices positioned in parallel to one another, and each can be regarded as a base station (BS) or a mobile base station, for example, or each can be also regarded as a terminal (a mobile terminal, in particular) managed by the communication management device 10. When being a (mobile) base station, the managed devices 1 to 4 each can include a terminal (not illustrated) to be connected thereto. The managed devices 1 to 4 are each configured to operate under the TVWS environment.

For each combination pair of two of the managed devices 1 to 4 (to be sometimes denoted by A to D, hereinafter), a link for communication can be established. When at least one link is established when seen from the individual managed devices even though all the illustrated links are not established, communication can be made between all the arbitrary managed devices. This is because another managed device can be used as a relay device.

Such a mesh network structure has a solution to a question which path including a relay should be used between all the arbitrary two managed devices in order to obtain the best communication quality between the arbitrary two managed devices, but the solution is unobvious, and further the solution also fluctuates according to a change in communication environment. As the typical changes in communication environment, electric field changes of use frequencies caused by the positions of the managed devices 1 to 4 being moved, a conflict with another secondary user, and the like can be thought.

The communication management device 10 is provided in a state capable of being connected to all the managed devices 1 to 4 for the purpose of managing the managed devices 1 to 4. Functions necessary for the management will be described in detail later, but to put it simply, the functions are to search for the solution to the question which path including a relay should be used between all the arbitrary managed devices under the TVWS environment in order to obtain the best communication quality between the arbitrary managed devices and to direct each of the managed devices 1 to 4 to establish necessary links according to result of the search.

The database 20 is a server provided on the Internet so as to at least provide information on available frequencies to secondary users to be operated under the TVWS environment without affecting primary users. It is essential that the available frequencies to be transmitted back should not at least affect primary users, and it is also possible to presuppose that frequencies already allocated to other secondary users are removed. In the system illustrated in FIG. 1, it is presupposed that the connection to the database 20 is performed exclusively by the management device 10. However, a configuration such that the managed devices 1 to 4 each is directly connected to the database 20 is not excluded.

Figure 2:
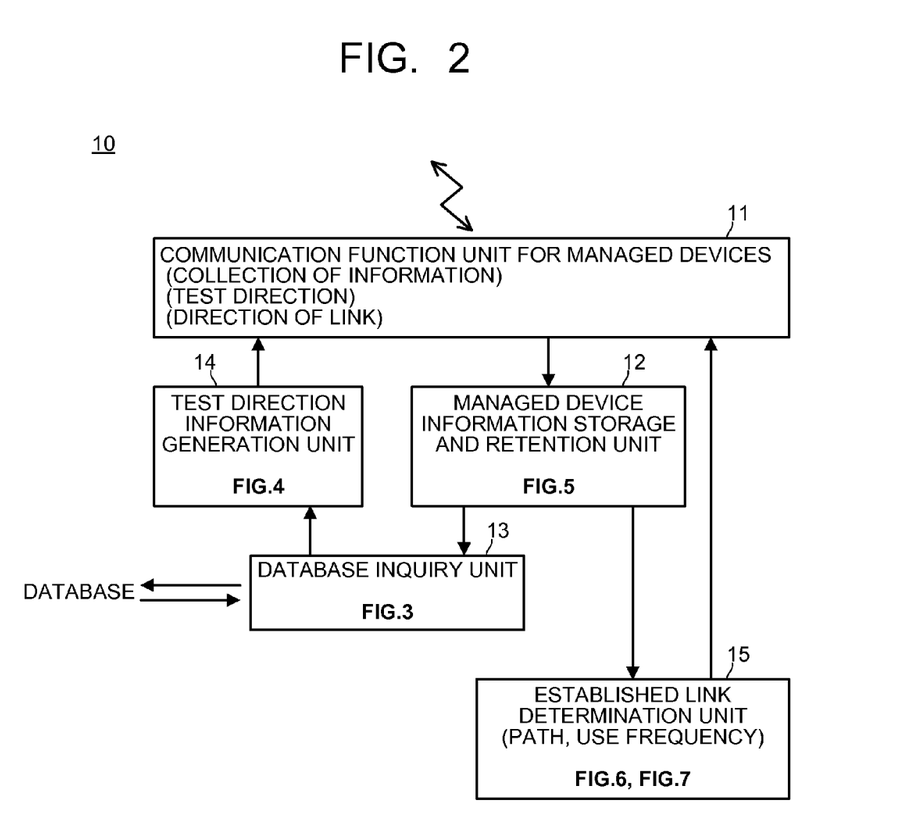
FIG. 2 is a functional block diagram illustrating a configuration of the communication management device being one embodiment of the present invention.

Next, FIG. 2 is a functional block diagram illustrating the configuration of the communication management device being one embodiment of the present invention. In other words, it illustrates an internal structure of the communication management device 10 illustrated in FIG. 1. As illustrated in FIG. 1, this communication management device 10 includes: a communication function unit 11 for managed devices; a managed device information storage and retention unit 12; a database inquiry unit 13; a test direction information generation unit 14; and an established link determination unit 15.

Figure 3:
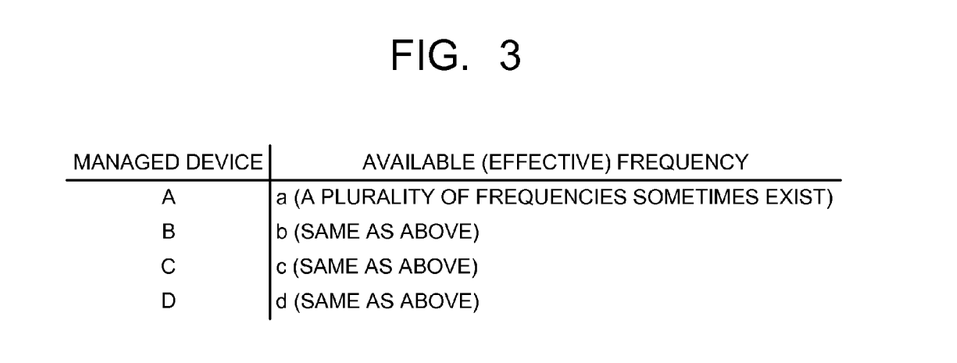
FIG. 3 is an explanatory diagram illustrating, as an example, a corresponding list of managed devices and available frequencies that can be acquired from a database by a database inquiry unit 13 illustrated in FIG. 2.
Figure 8:
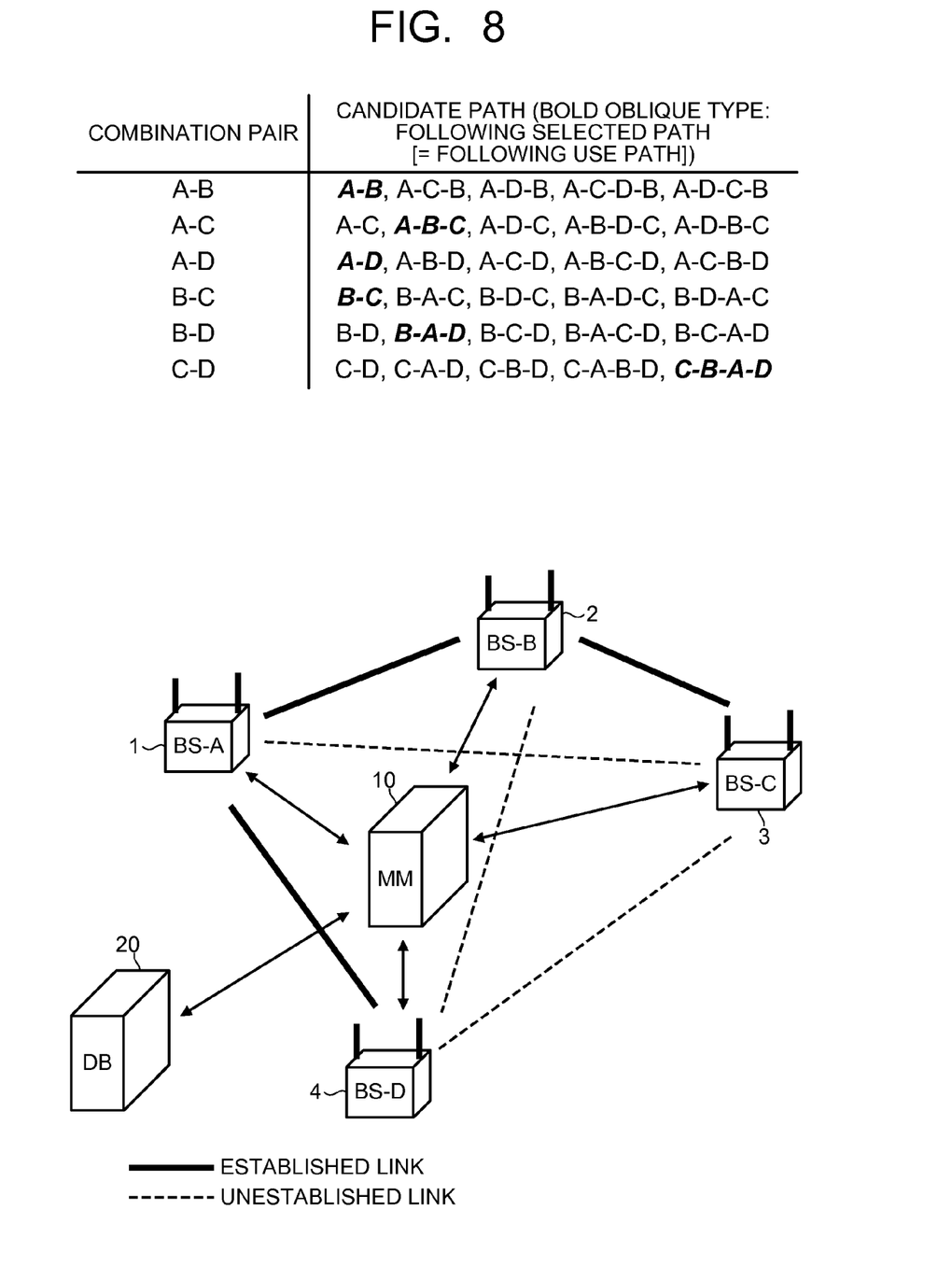
FIG. 8 is an explanatory diagram illustrating a use path for each combination pair selected by the established link determination unit 15 illustrated in FIG. 2, which is different from the one illustrated in FIG. 7 and is a system configuration diagram illustrating a mesh network where results are reflected.

FIG. 2 illustrates the functional block diagram, and when functions and operations of the configuration in this drawing are each explained, FIG. 3 or FIG. 8 is used as a reference as necessary.

First, the communication function unit 11 for managed devices has a function to acquire a geographical position from each of the managed devices. The managed devices are each at least provided with a function to specify a current geographical position of its own device by using a GPS satellite, for example, which is not mentioned in the explanation in FIG. 1. Each of the acquired geographical positions is sent to the managed device information storage and retention unit 12 to be stored and retained therein. The communication function unit 11 and the managed device information storage and retention unit 12 also have other important functions, but in detail the functions will be described later.

Each of the geographical positions of the managed devices stored and retained in the managed device information storage and retention unit 12 is sent to the database inquiry unit 13. The database inquiry unit 13 transmits each of the geographical positions sent from the information storage and retention unit 12 to the database and inquires about a frequency band available at the position (and additionally, maximum transmission power and further several regulations of use depending on the case).

From the database, for example, information on frequency available in each of the managed devices (a corresponding list) illustrated in FIG. 3 is transmitted back. The information is a corresponding list such that the available frequency corresponding to the geographical position of the managed device A, for example, is a. A plurality of available frequencies a exist potentially in general. The same can be said with regard to the other managed devices B to D and available frequencies b to d. Incidentally, in FIG. 3, illustration of "maximum transmission power and further various regulations of use" is omitted. The corresponding list obtained from the database is stored and retained in the database inquiry unit 13 and is sent to the test direction information generation unit 14.

The test direction information generation unit 14 specifies, for each of all the combination pairs of two managed devices of the managed devices, a frequency available in common by the two managed devices as a pair available frequency based on the corresponding list. This will be further explained as blow with reference to FIG. 4.

Figure 4:
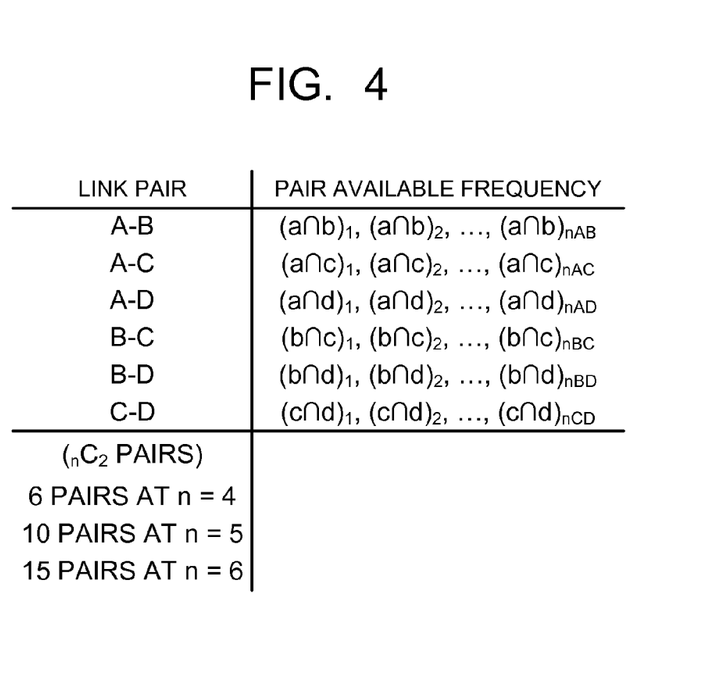
FIG. 4 is an explanatory diagram illustrating available frequencies for each link pair that can be generated by a test direction information generation unit 14 illustrated in FIG. 2.

In the system illustrated in FIG. 1, with regard to all the combination pairs of two managed devices of the managed devices (to be sometimes referred to as link pairs below, which means that they have a possibility to be established as a link and is not related to whether they are actually in a link state), as illustrated in FIG. 4, there are 6 pairs of A-B, A-C, A-D, B-C, B-D, and C-D. The number of pairs can be calculated by $_nC_2$ generally (combinations of two arbitrarily selected from n pieces of managed devices).

Frequencies available for each link pair can be conceived as frequencies available in common by the two related managed devices, and as illustrated in FIG. 4, with regard to a link pair A-B, for example, $(a \cap b)_1, (a \cap b)_2, \ldots, (a \cap b)_{nAB}$ can be cited and specified. Incidentally, generally, there is also a possibility that no frequencies available in common exist (namely $a \cap b = \phi$) and no pair available frequencies exist. With regard to the above point, the same can be said also in the other link pairs.

The test direction information generation unit 14 sends the pair available frequency specified as above to the communication function unit 11, and thereby the communication function unit 11 notifies the pair available frequency to one of the two related managed devices together with identification information of the other managed device and notifies the pair available frequency to the other of the two related managed devices together with identification information of the one managed device. The pair available frequency becomes part of direction information used for measuring communication quality in each of the managed devices.

Each of the managed devices having had the pair available frequency notified thereto measures pair communication quality being quality of communication between the related combination pair obtained when the pair available frequency is used by actually supplying small-scale test data, for example.

As such pair communication quality, maximum communication speed, delay, jitter, a packet loss rate, and a bit error rate, and the like between the two managed devices obtained when the pair available frequencies are used can be cited as an example. For the pair communication quality, at least one of them can be used, but some of them may also be measured to be used. Further, as one of the pair communication qualities, it is also possible to use (mutual) electric field intensity between one managed device and the other managed device that are capable of using the pair available frequencies and are related to the pair communication quality.

The measurement of the pair communication quality in the individual managed devices is designed to be performed periodically, for example, with respect to all the link pairs regardless of whether or not the link state is established. A result of the measurement is collected (or reported) and acquired from the individual managed devices via the communication function unit 11, and is stored and retained in the managed device information storage and retention unit 12 (it may be accumulated but at least the latest one is stored and retained).

Figure 5:
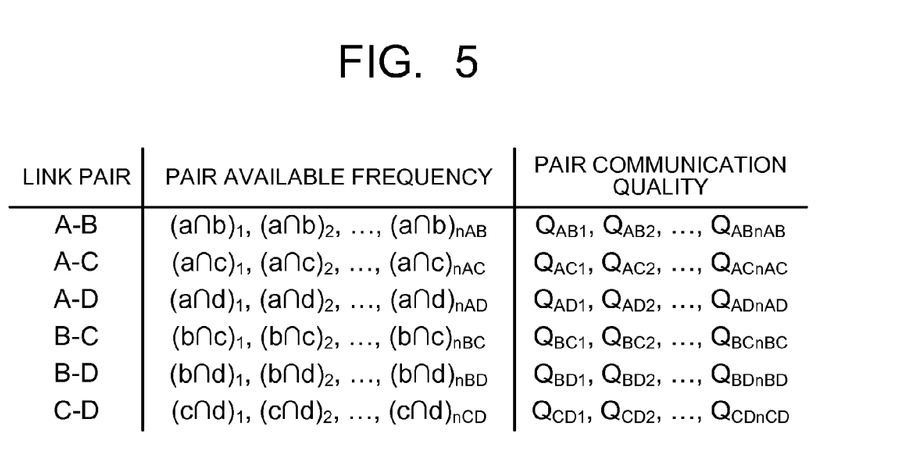
FIG. 5 is an explanatory diagram illustrating correspondences of pair communication quality to each link pair and to each pair available frequency that can be stored and retained by a managed device information storage and retention unit 12 illustrated in FIG. 2 via a communication function unit 11 for managed devices.

The latest information stored and retained as above is illustrated in FIG. 5, for example. That is, pair communication quality Q corresponds to each pair available frequency of the individual link pairs. There is also a possibility that each of the pair communication qualities Q is not single but is plural as above (namely, Q becomes a vector quantity). The information illustrated in FIG. 5 is sent to the established link determination unit 15 from the storage and retention unit 12. By the way, in the case of the link pair having no pair available frequency, with regard to the pair communication quality of the link pair, a numeral value indicating the worst quality, for example, can be given for convenience.

Incidentally, in order that the measurement of the pair communication quality in the individual managed devices should be performed periodically for all the link pairs, an operation of acquiring the geographical position from each of the managed devices, acquiring the information of the frequency available at the position (FIG. 3) from the database, and reporting the information of the pair available frequencies obtained thereby (FIG. 4) to the related managed devices is also preferably performed periodically. This is because there are possibilities that the position of the managed device is moved, due to another cause, the communication environment changes and thereby the pair available frequencies also vary.

Figure 6:
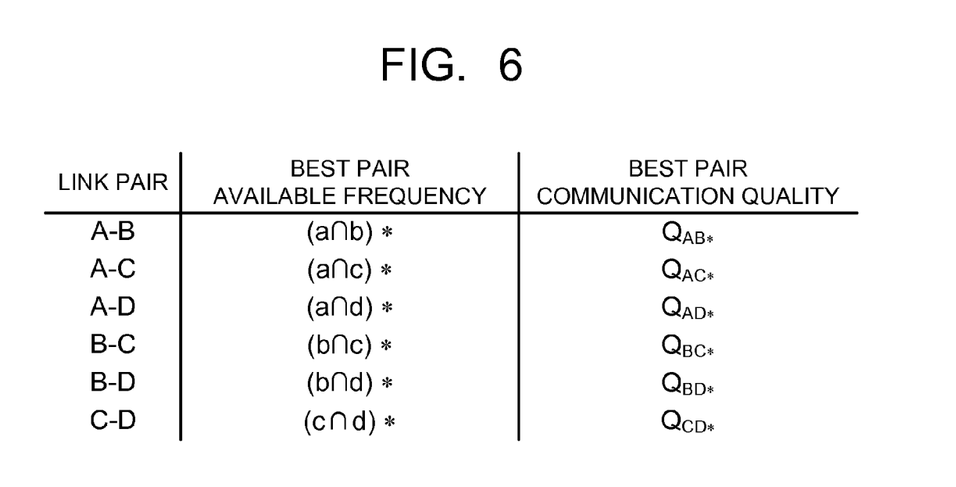
FIG. 6 is an explanatory diagram illustrating the best pair available frequency and the best pair communication quality for each link pair that are defined by an established link defining unit 15 illustrated in FIG. 2.

The established link determination unit 15 first uses the information illustrated in FIG. 5 sent from the storage and retention unit 12 to select the best pair communication quality to be the best from the pair communication qualities contained in the information for each link pair, and further defines the best pair available frequency being the pair available frequency corresponding to this. Here, when the best pair communication quality in the link pair A-B, for example, is expressed as $Q_{AB*}$ and the best pair available frequency corresponding to it is expressed as (a∩b)*, a list of all the link pairs illustrated in FIG. 6 is obtained.

Incidentally, in order to select the best pair communication quality when the pair communication quality Q is a vector quantity, it is possible to apply a method in which an element of the vector quantity is weighted averaged to be defined by a scalar value, for example, or the like. A coefficient used for the weighted average can be set and selected appropriately according to specifications required for the communication.

The established link determination unit 15 next specifies, for each combination pair, all the paths including paths where communication is relayed by another managed device as candidate paths corresponding to each combination pair. In the case of the combination pair of A-B, for example, with regard to the candidate path, 5 paths of A-B, A-C-B, A-D-B, A-C-D-B, and A-D-C-B are specified. With regard also to the other combination pairs, all the paths can be specified as candidate paths similarly (see the chart in FIG. 7).

By the way, it is possible to calculate the number of candidate paths existing for one combination pair by $\sum_{i=0}^{n-2} {}_{(n-2)}C_i \cdot i!$ generally. This expression is that i being the number of devices to be a relay device is used as a parameter, the relay device is selected by ${}_{(n-2)}C_i$, ${}_{(n-2)}C_i$ and i! being sequence of possible paths for the relay device are multiplied, and the product of the multiplication is added in $\Sigma$ finally.

The established link determination unit 15 subsequently calculates, based on the information of the best pair communication quality illustrated in FIG. 6, path communication quality as the communication quality of each of the candidate paths where the communication between the combination pair using the best pair available frequency is made for each combination pair. When the combination pair is A-B and the candidate path is A-D-B, for example, the path communication quality of A-D-B can be calculated by using the best pair communication quality $Q_{AD*}$ of A-D and the best pair communication quality $Q_{BD*}$ of B-D (being the same as D-B).

Figure 7:
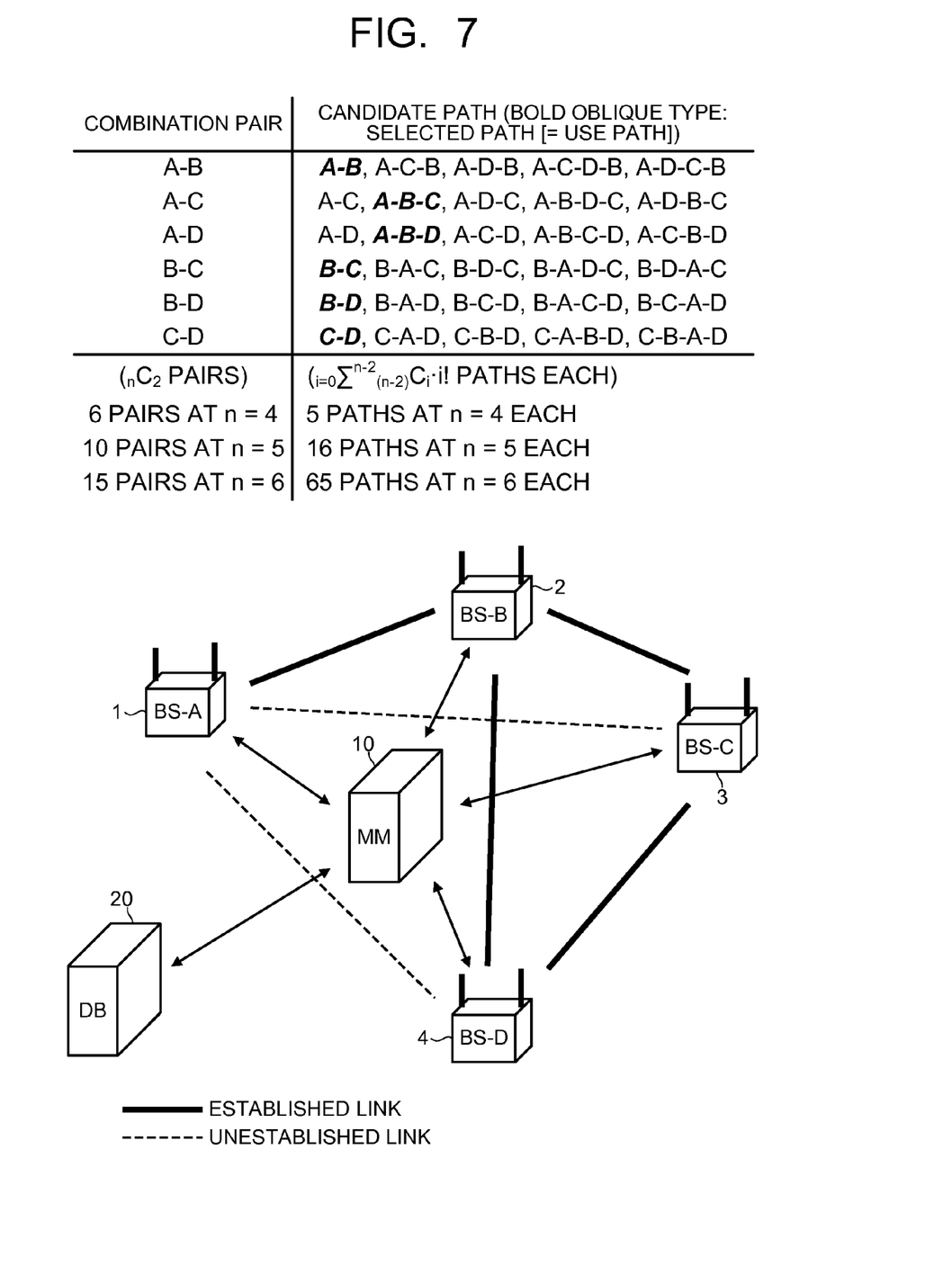
FIG. 7 is an explanatory diagram illustrating a use path for each combination pair selected by the established link determination unit 15 illustrated in FIG. 2 and is a system configuration diagram illustrating a mesh network where results are reflected.

As is clear from the list illustrated in FIG. 7, in this case, 5 types of path communication qualities are calculated for each combination pair. There are 6 pairs of the combination pairs in this case, so that 30 types of path communication qualities in total are calculated. In order to compact a calculation amount, when there exists a link to which a "numerical value indicating the worst quality" is given in the path, for example, it is also possible to design that the calculation of the path is stopped (is not performed).

In order to calculate the path communication quality from the plurality of best pair communication qualities as above, based on the nature of the quality, an evaluation function can be set. When the quality is "delay," for example, a total delay amount of the path results in the sum of delays at the individual link pairs, so that the evaluation function can be set as the sum of delay amounts of the individual link pairs. Further, when the quality is "communication speed," with regard to the total communication speed of the path, the link pair having the minimum communication speed becomes a bottleneck, so that the evaluation function can be set as a function in which the minimum value is selected from the delay amounts of the individual link pairs. Further, when the quality is a "bit error rate," an evaluation function of an expression such as, for example, "1−(1−bit error rate $_{A-D}$)• (1−bit error rate $_{B-D}$)" where the total error rate of the path is calculated can be set.

The established link determination unit 15 subsequently selects the candidate path where the best path communication quality is obtained from the candidate paths as a use path for each combination pair. In the list illustrated in FIG. 7, for example, it is set that the candidate path illustrated in bold oblique type for each combination pair has the best path communication quality to thus be selected. Incidentally, when the pair communication quality is a vector quantity in general, the path communication quality also becomes a vector quantity having the same element number. In order to select the best in such a case, for example, it is possible to apply a method in which an element of a vector quantity of the best is weighted averaged to be defined by a scalar value, or the like. A coefficient used for the weighted average can be set and selected appropriately according to specifications required for the communication.

The established link determination unit 15 finally generates information to direct each of the managed devices to perform the communication between the combination pair by using the above-described use path where the communication between the link pair using the best pair available frequency is made. This direction information is transmitted to the individual managed devices from the established link determination unit 15 via the communication function unit 11. By such a direction, the network of the managed devices is brought into a state where established links and unestablished links exist as illustrated in FIG. 7, for example. In this case, 4 links of A-B, B-C, B-D, and C-D are the established links, and as long as they are established, all the "selected paths" in the list in FIG. 7 are established. That is, the quality of communication between all the respective two managed devices becomes the best.

In the foregoing, the communication management device being one embodiment of the present invention has been explained. As long as the communication between the managed devices is performed by using the use path selected as above, it is possible to well maintain the communication qualities while accommodating the momentarily changeable communication environment. This is because originally, each of the pair communication qualities obtained when the pair available frequencies are used is acquired from the individual managed devices, and based on it, the communication between the link pair using the best pair available frequency is performed by the use path.

When the link states of the mesh network are established as illustrated in FIG. 7, for example, when the communication environment changes somewhat, by the steps explained by using FIG. 3 to FIG. 7, the link states can be changed so that another use path may be selected. One example obtained after the change is illustrated in FIG. 8. In this case, 3 of A-B, A-D, and B-C are the established links, and as long as they are established, all the "following selected paths" in the list in FIG. 8 are established. That is, the quality of communication between all the respective two managed devices becomes the best.

The embodiment explained above is suitable for the case when a communication infrastructure is established temporarily or the case when a communication infrastructure is handled urgently at the time of disaster, for example. That is, even if a plurality of base stations are installed at appropriate positions without a strict plan, the best links are established automatically while accommodating communication environment changes, and thereby it is possible to establish a network covering an areally broad region.

Next, there will be explained modified examples of the above-explained embodiment supplementally. In the above-described embodiment, the geographical position is acquired from each of the managed devices, each of the geographical positions is transmitted to the database, and for the purpose of storing and retaining the corresponding list, the corresponding list transmitted from the database as the information corresponding to the individual geographical positions is received, but the above-described embodiment can also be configured as follows. That is, when each of the managed devices has a function to connect to the database, it inquires of the database about the available frequency in the managed device and the information of the available frequencies being the information corresponding to the individual geographical positions is transmitted from the managed devices, and thereby the information can be collected as the above-described corresponding list in the communication management device.

Further, in the above-described embodiment, the communication management device exists independently from the managed devices, but the communication management device may also function as one of the managed devices. That is, this is that one of the managed devices is provided with the configuration as the communication management device, and in other words, this is a configuration in which one of communication devices positioned in parallel that are capable of forming a mesh is also a management device. As above, it is possible to make an independent device take on the function as the communication management device, and it is also possible to make one of communication devices positioned in parallel that are capable of forming a mesh take on the function as the communication management device.

Further, it is also possible to design that a function to direct each of the managed devices to measure each of the pair communication qualities is provided in the communication management device. That is, this is an embodiment in which when a communication environment change is detected on the communication management device side, for example, in order to change a mesh structure (link states), a direction to start an operation of the change is given temporarily.

In the foregoing, while certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and sprit of the inventions.

What is claimed is:

1. A communication management device comprising:
a storing unit configured to store and retain a corresponding list, the list making each geographical position of a plurality of managed devices to be managed correspond to available frequencies indicating frequencies available at the each geographical position;
a first specifying unit configured to specify, for each combination pair being arbitrary two managed devices out of the plurality of managed devices, frequencies available in common by the arbitrary two managed devices as pair available frequencies based on the corresponding list;
a notifying unit configured to notify the pair available frequencies to each of the arbitrary two managed devices related to the pair available frequencies;
an acquiring unit configured to acquire each of pair communication qualities being a quality of communication in the each combination pair obtained when each of the pair available frequencies specified for the each combination pair is used from each of the plurality of managed devices;
a defining unit configured to define, for the each combination pair, a best pair available frequency out of the pair available frequencies, being capable of obtaining a best of the pair communication qualities and to define a best pair communication quality out of the pair communication qualities, corresponding to the best pair available frequency;
a second specifying unit configured to specify, for the each combination pair, all of paths connecting one and another of the each combination pair, each of the paths being capable of relaying other managed devices out of the plurality of managed devices as candidate paths of the each combination pair;
a calculating unit configured to calculate, for the each combination pair, based on information of the best pair communication quality, each of path communication qualities being a quality of communication in each of the candidate paths connecting one or more communications in the each combination pair using the best pair available frequency;
a selecting unit configured to select, for the each combination pair, a path out of the candidate paths, the path having a best quality in the path communication qualities as a use path for the each combination pair; and a directing unit configured to direct each of the plurality of managed devices to perform communication between one and another of the each combination pair by using the use path connecting one or more communications in the each combination pair using the best pair available frequency.

2. The communication management device according to claim 1, further comprising:
a second acquiring unit configured to acquire the geographical position from each of the plurality of managed devices;
a transmitting unit configured to transmit each of the geographical positions to a database; and
a receiving unit configured to receive the corresponding list transmitted from the database as information corresponding to the each geographical position for the purpose of storing and retaining the corresponding list.

3. The communication management device according to claim 1, further comprising:
a functioning unit configured to function as one of the plurality of managed devices.

4. The communication management device according to claim 1, further comprising:
a second directing unit configured to direct each of the plurality of managed devices to measure each of the pair communication qualities.

5. The communication management device according to claim 1,
wherein the pair communication qualities are qualities based on one or more pieces of information out of, mutual electric field intensity between one and another of the each combination pair that are capable of using the pair available frequencies and are related to the pair communication qualities, maximum communication speed, delay, jitter, a packet loss rate, and a bit error rate between the one and the other of the each combination pair that are obtained when the pair available frequencies are used.

6. A communication management method comprising:
storing and retaining a corresponding list, the list making each geographical position of a plurality of managed devices to be managed correspond to available frequencies indicating frequencies available at the each geographical position;

specifying, for each combination pair being arbitrary two managed devices out of the plurality of managed devices, frequencies available in common by the arbitrary two managed devices as pair available frequencies based on the corresponding list;

notifying the pair available frequencies to each of the arbitrary two managed devices related to the pair available frequencies;

acquiring each of pair communication qualities being a quality of communication in the each combination pair obtained when each of the pair available frequencies specified for the each combination pair is used from each of the plurality of managed devices;

defining, for the each combination pair, a best pair available frequency out of the pair available frequencies, being capable of obtaining a best of the pair communication qualities and defining a best pair communication quality out of the pair communication qualities, corresponding to the best pair available frequency;

specifying, for the each combination pair, all of paths connecting one and another of the each combination pair, each of the paths being capable of relaying other managed devices out of the plurality of managed devices as candidate paths of the each combination pair;

calculating, for the each combination pair, based on information of the best pair communication quality, each of path communication qualities being a quality of communication in each of the candidate paths connecting one or more communications in the each combination pair using the best pair available frequency;

selecting, for the each combination pair, a path out of the candidate paths, the path having a best quality in the path communication qualities as a use path for the each combination pair; and directing each of the plurality of managed devices to perform communication between one and another of the each combination pair by using the use path connecting one or more communications in the each combination pair using the best pair available frequency.

* * * * *